March 12, 1963 I. W. WOLF ET AL 3,081,210
METHOD FOR FABRICATING SMALL ELEMENTS OF THIN MAGNETIC FILM
Filed April 4, 1960
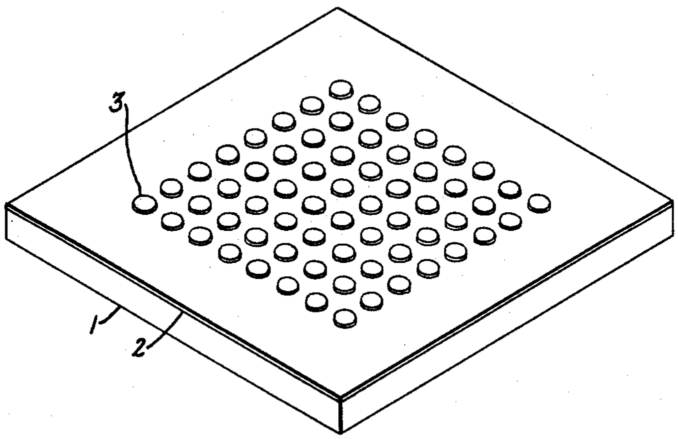
INVENTORS:
IRVING W. WOLF,
OLIVER G. WHITE,
BY Dudley J. Ready
THEIR AGENT.

United States Patent Office 3,081,210

Patented Mar. 12, 1963

3,081,210

METHOD FOR FABRICATING SMALL ELEMENTS OF THIN MAGNETIC FILM

Irving W. Wolf, Liverpool, and Oliver G. White, North Syracuse, N.Y., assignors to General Electric Company, a corporation of New York Filed Apr. 4, 1960, Ser. No. 19,782

9 Claims. (Cl. 156—8)

This invention relates to a method for fabricating individual elements and surface patterns of elements consisting of very thin magnetic films. This method makes possible the formation of complex patterns of inherently fragile elements which are simply and easily reproduced with high precision. The resulting film patterns are of utility as computer storage matrices, parametric devices and the like.

An example of a desired product is a surface pattern of thin dots composed of magnetic film in which the dots are arranged in rows and columns forming a matrix. The dots are on a base plane upon which they are conveniently created and which forms the necessary mechanical support. The dots are typically one sixteenth of an inch in diameter and on the order of one ten thousandth of a millimeter in thickness. It is essential that these films have uniformly smooth surfaces to provide the proper magnetic properties and that they be accurately positioned and have uniform dimensions. These characteristics obviously impose serious conditions on the method of fabrication.

One method of obtaining a desired pattern of thin magnetic film elements is by preforming a substrate electrode on a support member with the substrate formed in the desired pattern and then electrodepositing a magnetic film on the substrate electrode pattern. This process is cumbersome where the desired pattern has a number of isolated elements since leads have to be individually connected to each isolated element for electrodeposition. It has also been found that the connections necessary for this method create stresses in the base which inhibit the formation of a film with the desired magnetic characteristics.

An object of this invention is to provide an improved method for fabricating patterns of small elements composed of a thin magnetic film.

A further object of this invention is to provide a simple, precision method of fabricating magnetic film patterns wherein the method can be repeatedly applied to produce the desired pattern without deterioration of the accuracy and wherein the method does not have a deleterious effect on the desired film properties.

Another object of this invention is to provide a simple method of fabricating a matrix of thin magnetic film elements composed of a nickel-iron alloy and whose thickness is on the order of 1000 angstrom units.

Briefly stated, the fabrication method in accordance with the disclosed invention is as follows: Initially, there is provided a member having a surface of uniform thin magnetic film on the order of one thousand angstroms in thickness preformed thereon. This member is comprised of a base plate such as glass upon one surface of which is formed a substrate layer such as gold underlying a thin magnetic film of a permalloy type material (i.e., nickel-iron alloys with a ratio of approximately 4:1 and with or without additives). The individual film elements are created by an etching process which removes that portion of the film which is not part of the desired pattern. This process consists of applying a coating of actinically reactive masking material over the permalloy film. The masking material is then selectively exposed to actinic radiation in such a manner that exposed portions are formed in the desired pattern. A chemical agent is used to remove the unexposed portions of the masking material. By immersing the member in a dilute solution of ferric chloride, the unmasked film is etched away leaving the masked portions of the film in the desired pattern without defects.

The invention will be better understood from the following description taken in connection with the accompanying drawing and its scope will be pointed out in the appended claims.

FIGURE 1 illustrates a greatly enlarged typical magnetic film matrix pattern array obtained by the disclosed process.

The typical film pattern of FIGURE 1 is suitable for use as a memory matrix which is representative of the desired products. A smooth, one inch square base 1, which is conveniently a fire-polished glass plate has a substrate layer of gold sputtered thereon to a thickness of a few hundred angstrom units, as shown at 2. On the substrate is formed a pattern of magnetic permalloy film 3 in an 8 x 8 array. This film is of a thickness on the order of one thousand angstroms in the interests of optimum magnetic properties with an anisotropic axis of magnetization having a square hysteresis loop characteristic. The elements are approximately .07 inch in diameter on 0.1 inch centers. These elements are adapted to operate in a manner similar to magnetic cores with signal wires adjacent their surface as disclosed in the Journal of Applied Physics, supplement to volume 30, No. 4, April 1959, pp. 60S and 61S ("Operating Characteristics of a Thin Film Memory") by J. I. Raffel. In order that the elements may produce a uniform amount of flux and conform to a desired location within critical limits, it is necessary to utilize a precision technique in the formation of the array. It is also essential to have a pattern which is easily reproduced.

The initial member from which the magnetic element array is made is the fire-polished glass plate 1, as shown in FIGURE 1, upon which a substrate 2 of gold is sputtered. Over this substrate is deposited a uniform magnetic film such as permalloy which is composed of nickel and iron in the proportions of 4 to 1. The process is applicable to a range of thicknesses of magnetic film on the order of one thousand angstroms, i.e., from a value of about one hundred to a value measured in thousands of angstrom units. The film may have the shape of a rectangular plane, one or more strips, or some other desired geometrical form. A suitable process for the preparation of the initial magnetic film bearing member is disclosed in the application of Irving W. Wolf titled "Method of Fabricating Thin Films and a Thin Film Product," Serial No. 18,171, filed concurrently, and assigned to the assignee of the present application. Briefly stated, this process comprises two steps: An electrode substrate (for electrodeposition of the magnetic film) is formed on a uniformly smooth glass plate preferably by sputtering gold at critically controlled voltages to provide a uniform substrate surface. The permalloy film is then formed by slow electrodeposition in a bath of solution in the presence of a magnetic field tangential to the surface with a strength above a threshold value which creases an anisotropic axis of "easy" magnetization. Along this axis the film has the characteristics of high retentivity and high permeability. The film formation technique, per se, is only determined by the requirements of an extensive thin film surface. The prescribed element fabrication method in accordance with this invention does not affect the properties of the film itself.

The pattern fabrication process comprises the formation of a mask in the configuration of the desired pattern over the film surface on the glass plate and then etching away the unmasked film.

Because of the inherent properties of thin magnetic films and thin films in general, a film with a thickness of the order of 1/10,000 of a millimeter is easily damaged. Therefore, the masking procedure must not be a coarse operation which would damage the film. For example, any masking that would apply a substantial stress to the plane would result in detriment to the magnetic properties of the permalloy film.

First, the masking fluid is evenly applied over a clean film on a support plate. The masking fluid is actinically reactive, that is, of such a nature that it is soluble in a developer unless sensitized by light. The masking fluid is accordingly susceptible to being patterned photographically. A suitable masking fluid is Kodak Photoresist preferably having a conventional concentration which is applied to produce a thickness of about 20 microns. Kodak Photoresist is the tradename applied by the Eastman Kodak Company of Rochester, New York, to the product marketed for this purpose. A satisfactory technique is to dip the film surface in a bath of Kodak Photoresist, and then remove the excess fluid by applying a blotter to the corner of the tipped base. The thickness of the masking material is critical in that too thin a coating is porous to the etching solution and too thick a coating tends to peel and permit undercutting by the etching solution.

After air drying at 75° C., a negative of the desired pattern is placed over the masking coating and the exposed coating is sensitized by ultraviolet light. Any conventional negative of high contrast is suitable. A satisfactory source of ultraviolet light is a mercury vapor lamp. An exposure for two minutes at an intensity of a 1/4 watt per square centimeter is sufficient. The exposure is not critical beyond the minimum exposure sufficient for sensitization and since the relation of time and intensity is roughly linear, exposure sufficient to sensitize the masking material is determined only by assuring the minimum photochemical reaction necessary to assure sensitization of the masking material.

The unsensitized masking coating is then dissolved by a suitable developer solvent. For Kodak Photoresist the corresponding material is Kodak Photoresist developer having a conventional concentration. Kodak Photoresist is the tradename applied by the Eastman Kodak Company of Rochester, New York, to the product marketed for this purpose. A convenient procedure is to immerse the film in four clean developer baths in succession. The developer action is improved by heating with thirty-second immersions in each bath at about 50° C., i.e., near the boiling point.

The unmasked film is then removed in an etching solution bath. Because of the very thin nature of the film a very weak etch solution is used. If the etch is not sufficiently diluted, serious undercutting, channeling and pinholes will result. A dilution to 2% (by volume) in water of 42° Baumé ferric chloride results in a complete etching in 1–1½ minutes with slight agitation for a 1000 A. film. (In the case of macroetching, 100% solutions are used, thus a different order of magnitude of dilution is employed.)

The undercutting and channeling rates increase more rapidly with increasing concentration of etch than does the etch rate of the exposed permalloy. This effect is believed to be due to the fact that the replacement rate for used solution (in direct contact with undercut or etched film) is greater for exposed films than for undercut films. Thus the etch replacement rate may be the limiter of undercutting or channeling. This replacement rate effect would be much more pronounced for the low concentration etch than the high. Solutions of five to ten percent cause channeling and pinhole defects in the film if applied for more than about one second which are destructive of the magnetic properties to a degree which makes the films inoperative. In practice, the strength of the ferric chloride solution may vary from 1–5% of 42° Baumé. If desired, the unsensitized masking material can be removed by a suitable solvent. In the case of Kodak Photoresist, a product of the Eastman Kodak Company, this solvent may be Econo-Strip, a product of the Beck Corporation.

Undercutting by etching away the film under the periphery of the mask is negligible, if the method is practiced as taught above. The resulting pattern is accordingly produced with an overall accuracy of within 25 microns. Since the photographic pattern element used in sensitizing the masking material is unaffected by the process, there is no loss in accuracy from repeated reproduction of the film pattern.

It is to be understood that the invention is not to be considered limited to the specific method of mask formation. The mask, however, must be impervious to ferric chloride. For example, other materials such as a 1% solution of sodium bichromate in polyvinyl alcohol may be used as a photosensitive masking material or a material sensitive to X-rays or electrons. Although the method has particular utility to electrodeposited thin magnetic films, it has application generally to thin films having similar characteristics. The true scope of the invention including those variations apparent to one skilled in the art is defined in the following claims.

What is claimed is:

1. The method of producing a logic matrix having a surface array of discrete, thin permalloy film elements from a member having on the surface thereof a continuous, thin permalloy film whose thickness is on the order of 1000 angstroms, said method comprising: the step of masking portions of said film corresponding to desired elements in the final matrix for preventing attack by ferric chloride; and immersing said member in an etching solution of 1 to 5% of 42° Baumé ferric chloride to remove the unmasked portions of said permalloy film.

2. The method of producing from a member having on the surface thereof a continuous, thin magnetic film whose thickness is on the order of 1000 angstroms, a desired surface pattern of magnetic film comprising: the step of coating said magnetic film with a layer of radiation reactive masking material; selectively exposing said masking material to actinic radiation in accordance with said desired surface pattern; removing said unexposed masking material by a chemical agent which dissolves said unexposed masking material; immersing said member in an etching solution of 1 to 5% 42° Baumé ferric chloride to provide a slow removal of magnetic film; and removing said member from said etching solution after the unmasked portions of the magnetic film are dissolved and before the masked portions have developed channels and pin holes.

3. The method of producing from a member having on the surface thereof a continuous, thin magnetic film whose thickness is on the order of 1000 angstroms, a surface pattern of magnetic film comprising: the step of coating said magnetic film with a layer of actinically reactive masking material; selectively exposing said masking material to actinic radiation in accordance with said surface pattern; removing said unexposed masking material by a chemical agent which dissolves said unexposed masking material; and immersing said member in an etching solution of 1 to 5% 42° Baumé ferric chloride to remove the unmasked portions of said magnetic film.

4. The method of producing from a member having on the surface thereof a continuous, thin magnetic film whose thickness is on the order of 1000 angstroms, a desired surface pattern of magnetic film comprising: the step of coating said magnetic film with a layer of actinically reactive masking material; selectively exposing said masking material to actinic radiation in accordance with said desired surface pattern; removing said unexposed masking material by a chemical agent which dissolves said unexposed masking material; immersing said member in an etching solution of 1 to 5% of 42° Baumé ferric chloride to provide a slow removal of said magnetic film; and removing said member from said etching solution after the unmasked portions of the magnetic film are dissolved.

5. The method of producing a logic matrix having a surface array of discrete, thin permalloy film elements from a member having on the surface thereof a continuous, thin permalloy film whose thickness is on the order of 1000 angstroms, said method comprising: the step of coating said permalloy film with a layer of radiation reactive masking material; selectively exposing said masking material to radiation in accordance with said desired array; removing said unexposed masking material by a chemical agent which dissolves said unexposed masking material; and immersing said member in an etching solution of 1 to 5% of 42° Baumé ferric chloride to remove the unmasked portions of said permalloy film.

6. The method of producing a logic matrix having a surface array of discrete, thin permalloy film elements from a member having on the surface thereof a continuous, thin permalloy film whose thickness is on the order of 1000 angstroms, said method comprising: the step of coating said permalloy film with a layer of actinically reactive masking material; selectively exposing said masking material to actinic radiation in accordance with said desired array; removing said unexposed masking material by a chemical agent which dissolves said unexposed masking material; and immersing said member in an etching solution of 1 to 5% of 42° Baumé ferric chloride to remove the unmasked portions of said permalloy film.

7. The method of producing a logic matrix having a surface array of discrete, thin magnetic film elements from a member having on the surface thereof a continuous, thin permalloy film whose thickness is on the order of 1000 angstroms, said method comprising: the step of coating said magnetic film with a layer of actinically reactive masking material; selectively exposing said masking material to actinic radiation in accordance with said desired array; removing said unexposed masking material by a chemical agent which dissolves said unexposed masking material; and dipping said member in an etching solution of dilute ferric chloride from one to five percent of a 42° Baumé solution for a period up to two and a half minutes in such a manner as to remove the unmasked portions of said magnetic film.

8. The method of producing from a member having on the surface thereof a continuous, thin permalloy film whose thickness is on the order of 1000 angstroms, a logic matrix having a surface array of discrete, thin film elements comprising: the step of coating said permalloy film with a layer of actinically reactive masking material; selectively exposing said masking material to actinic radiation in accordance with said desired surface pattern; removing said unexposed masking material by a chemical agent which dissolves said unexposed masking material; immersing said member in an etching solution of two percent of 42° Baumé solution of ferric chloride to provide a slow removal of said permalloy film; and removing said member from said etching solution after one to one and a half minutes so that the unmasked portions of the permalloy film are dissolved.

9. The method of producing a logic matrix having a surface array of discrete, thin permalloy film elements from a member having on the surface thereof a continuous, thin permalloy film electrodeposited to a thickness on the order of 1000 angstroms over a gold substrate, said method comprising: the step of coating said permalloy film with a layer of actinically reactive masking; selectively exposing said masking material to actinic radiation in accordance with said desired array; removing said unexposed masking material by a chemical agent which dissolves said unexposed masking material; and immersing said member from 1–1½ minutes in 2% 42° Baumé solution of dilute ferric chloride to etch away the unmasked portions of said permalloy film.

References Cited in the file of this patent

UNITED STATES PATENTS

| | | |
|---|---|---|
| 2,215,128 | Meulendyke | Sept. 17, 1940 |
| 2,721,822 | Pritikin | Oct. 25, 1955 |
| 2,823,999 | Hamm | Feb. 18, 1958 |
| 2,849,298 | Werberig | Aug. 26, 1958 |
| 2,881,073 | Macloy | Apr. 7, 1959 |
| 2,904,432 | Ross et al. | Sept. 15, 1959 |
| 2,990,282 | Wicke | June 27, 1961 |